United States Patent Office 3,483,208
Patented Dec. 9, 1969

3,483,208
**N′-SUBSTITUTED N-(AMIDOSULFONYL)-
SULFONIC ACID AMIDES**
Ulrich Bahr, Opladen-Lutzenkirchen, Carlhans Süling, Leverkusen, and Günther Nischk and Jenö Szita, Dormagen, Germany, assignors to Farbenfabriken Bayer Aktiengesellschaft, Leverkusen, Germany, a corporation of Germany
No Drawing. Filed Apr. 4, 1967, Ser. No. 628,289
Claims priority, application Germany, Apr. 14, 1966, F 48,940; Apr. 28, 1966, F 49,041
Int. Cl. C07c *143/82;* C07d *31/48*
U.S. Cl. 260—293.4                3 Claims

ABSTRACT OF THE DISCLOSURE

Compounds of the formula

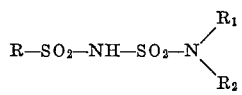

wherein R is methyl, phenyl, or phenyl substituted by nitro or methyl, and $R_1$ and $R_2$ each are a lower alkyl group or together are an alkylene group having 4–6 carbon atoms, and a method for their preparation by reaction of a sulfonic acid amide derivative of the formula

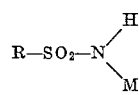

with a sulfonic acid halide of the formula

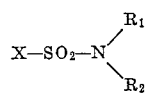

or of a sulfonic acid amide derivative of the formula

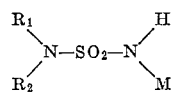

with a sulfonic acid halide of the formula

R—SO$_2$—X wherein X is halogen and M is an alkali metal. The compounds of this invention are useful in producing an acid reaction in polymerization reactions, especially in organic solvents.

---

This invention relates to N′-substituted N-(amidosulfonyl)-sulfonic acid amides and the methods of their preparation.

It is already known that disulfonylamides of the general formula

R$^3$—SO$_2$—NH—SO$_2$—R$^3$ wherein R$^3$ denotes the same or different organic radicals can be prepared by reacting sulfonic acid amides with sulfonic acid halides in aqueous alkaline solution, or without solvents or in the presence of inert solvents at elevated temperature. It has been found, however, that when N-substituted sulfamic acid chlorides are used under these reaction conditions, corresponding compounds are either not produced at all or only in very small yields. It is also known that no compounds result from the reaction of N-chlorosulfonyl arylsulfonic acid amides with amines. Only the related aryl sulfonic acid amides are obtained.

It is an object of the present invention to provide a new class of N-(amidosulfonyl)-sulfonic acid amides having the formula

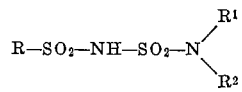

wherein R represents an alkyl or an aryl radical; $R^1$ and $R^2$ represent a lower alkyl radical or $R^1$ and $R^2$ are together an alkylene radical forming with the nitrogen atom a heterocyclic ring. Preferably R is phenyl or a substituted phenyl radical and $R^1$ and $R^2$ an alkyl having 1 to 4 carbon atoms or an alkylene having 4 to 6 carbon atoms.

Another object of this invention is a method for the production of N′-substituted N-(amidosulfonyl)-sulfonic acid amides in satisfactory yields by reacting an alkali metal derivative of a sulfonic acid amide of the formula

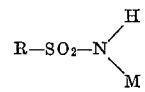

(wherein R denotes an alkyl or aryl radical and M an alkali metal) with a sulfamic acid halide of the formula

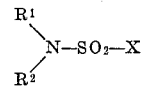

(wherein X denotes halogen and $R^1$ and $R^2$ each denote a lower alkyl radical and in which the two alkyl radicals may together with the nitrogen atom form a ring) in an inert organic solvent with the exclusion of water and in the presence of an acid-binding agent. The reaction is advantageously carried out at elevated temperature, preferably between about 70 and about 150° C. and with very intensive stirring. It is advantageous that both the alkali metal derivatives and the acid binding agents, if they are solid, are present in as finely divided a form as possible.

The alkali metal derivatives used are preferably the sodium and potassium salts of the sulfonamides, for example sodium methanesulfonamide, potassium benzene sulfonamide, sodium p-toluenesulfonamide and sodium m-nitrobenzenesulfonamide.

Suitable sulfamic acid chlorides are, for example, N,N-dimethylsulfamic acid chloride, N,N-diethylsulfamic acid chloride and N-chlorosulfonyl-piperidine. Suitable inert organic solvents are, for example, aromatic hydrocarbons such as toluene, and xylene or nitriles such as acetonitrile. As acid binding agents there may be used, for example, alkali metal carbonates such as sodium or potassium carbonate or tertiary amines such as triethylamine and dimethylcyclohexylamine. An excess of the alkali metal derivative of the sulfonic acid amide may be used. Alkali metal hydroxides in powder form may also be used.

A further object of this invention is a method of preparing N′-substituted N-(amidosulfonyl)-sulfonic acid amides in satisfactory yields by reacting alkali metal derivatives of N-substituted sulfuryl diamides of the following general formula

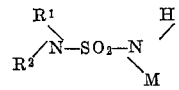

(wherein $R^1$ and $R^2$ each denote a lower alkyl radical and in which the two alkyl radicals may form a ring together with the nitrogen and M denotes an alkali metal) with sulfonic acid chlorides of the general formula

R—SO$_2$—X (wherein R denotes an alkyl or aryl radical and X denotes halogen), in an inert anhydrous organic solvent in the presence of an acid-binding agent.

The alkali metal derivatives used are preferably the sodium or potassium salts of sulfuryl amides, for example sodium N,N-dimethyl-sulfuryldiamide; sodium N,N-diethyl-sulfuryldiamide; or the sodium salt of N-amidosulfonyl-piperidine. The reaction is advantageously carried out at elevated temperature, preferably between 70 and about 150° C., with intensive stirring. It is advantageous if both the alkali metal derivatives and the acid binding agents, if they are solid, are present in as finely divided a form as possible. Suitable sulfonic acid chlorides are, for example, benzene sulfochloride; m-nitrobenzenesulfochloride; and p-toluenesulfochloride. Suitable inert, anhydrous organic solvents are aromatic hydrocarbons such as toluene and xylene or nitriles such as acetonitrile. Suitable acid binding agents are alkali metal carbonates (sodium or potassium carbonate); tertiary amines (triethylamine or dimethylcyclohexylamine); or an excess of the alkali metal derivative of sulfurylamide. Alkali metal hydroxides in pulverulent form may also be used.

The compounds prepared according to the invention are strong acids. They may be used, for example, with advantage, to produce an acid reaction in polymerisation reactions, especially in organic solvents, as illustrated by the following example:

In a sealed 100 cc. long necked flask, 23.5 g. of acrylonitrile and 1.5 g. of methyl acrylate dissolved in 75 g. dimethylsulfoxide, to which 0.3 g. of N-(dimethylamidosulfonyl)-p-toluene sulfonic acid amide and 0.6 g. of water are added, are polymerised by the addition of 0.28 g. of tertiary butyl permaleate (in the form of a 50% solution in dibutylphthalate) and 0.195 g. of benzenesulfinic acid amide as polymerisation initiator. A viscous solution is obtained after 4 hours' reaction at 25° C. The resulting polymer was precipitated in methanol, washed and dried in a vacuum at 60° C. The yield was 64%; the relative viscosity of a 0.5% solution of the polymer in dimethylformamide was 1.87 (measured at 25° C. in an Ubbelohde viscosimeter).

In a comparative test, without the addition of sulfonic acid amide compound, the yield was only 8.8%.

If the N-(dimethylamidosulfonyl)-p-toluenesulfonic acid amide is replaced by an organic sulfonic acid, e.g. p-toluene sulfonic acid, a polymer of a much darker colour is obtained.

The following examples illustrate more particularly the invention.

EXAMPLE 1

N-(dimethylamidosulfonyl) - 3 - nitrobenzenesulfonic acid amide

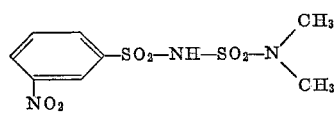

(a) 224 parts by weight (1 mol) sodium 3-nitrobenzene sulfonamide and 106 parts by weight (1 mol) finely powdered sodium carbonate are suspended in 850 parts by volume acetonitrile. 143.5 parts by weight (1 mol) N,N-dimethylsulfamic acid chloride are added dropwise at 80° C. with vigorous stirring, and the reaction mixture is boiled under reflux for 8 hours while vigorous stirring is continued. The solvent is removed by distillation at reduced pressure and the residue is extracted twice by adding 200 parts by volume of water at room temperature and stirring. Only the sodium chloride formed dissolves in the water. The solutions are discarded. The residue is again extracted, once with 400 and once with 250 parts by volume of water, a small quantity of 3-nitrobenzene sulfonic acid amide remaining behind while the sodium salt of N-(dimethylamidosulfonyl)-3-nitrobenzenesulfonic acid amide goes into solution. The disulfimide is precipitated by acidification with 120 parts by volume and 80 parts by volume respectively of concentrated hydrochloric acid. The yield is 141 parts by weight of a product of equivalent weight 315 (calculated 309) from the first extract and 88 parts by weight of equivalent weight 312 from the second extract. The yield is thus 229 parts by weight, corresponding to 74% of the theoretical. The product can be purified by recrystallisation from toluene or dissolving in sodium bicarbonate solution and reprecipitation with hydrochloric acid, and it then melts at 108 to 109° C.

$C_8H_{11}N_3O_6S_2$.—Calculated: C, 31.06%; H, 3.58%; N, 13.59%; S, 20.73%. Found: C, 31.15%; H, 3.49%; N, 13.69%; S, 21.84%.

(b) 224 parts by weight (1 mol) of sodium 3-nitrobenzene sulfonamide are suspended in 600 parts by volume of toluene. 72 parts by weight (0.5 mol) of N,N-dimethylsulfamic acid chloride are added dropwise at 80° C. with thorough stirring, and the reaction mixture is then heated for 8 hours under reflux. When the product is cold, it is separated by suction filtration. The residue is extracted with a total of 600 parts by volume of water in several portions, 102 parts by weight of 3-nitrobenzene sulfonamide remaining behind undissolved. 101.5 parts by weight (65.5% of the theoretical based on dimethylsulfamic acid chloride) of N-(dimethylamidosulfonyl)-3-nitro-benzenesulfonic acid amide of melting point 108 to 109° C. are obtained by acidifying the aqueous extracts with concentrated hydrochloric acid.

(c) 112 parts by weight (0.5 mol) of sodium 3-nitrobenzene sulfonamide are suspended in 300 parts by volume of toluene. After the addition of 67 parts by weight of N,N-dimethylcyclohexylamine, 72 parts by weight (0.5 mol) N,N-dimethylsulfamic acid chloride are added dropwise at 50° C. and the reaction mixture is heated to boiling for 3 hours with vigorous stirring. It is then left to cool slightly and a solution of 22 parts by weight of sodium hydroxide in 400 parts by volume of water is added and the reaction mixture is then stirred for one hour at about 50° C. The organic phase is separated and the aqueous phase is once more extracted with 100 parts by volume of toluene and acidified to pH 6–7 with concentrated hydrochloric acid. The precipitated 3-nitrobenzenesulfonamide (14 parts by weight) is separated by suction filtration at about 45° C., washed with a small quantity of water (40° C.) and 90 parts by volume of concentrated hydrochloric acid are added to the filtrate. 100 parts by weight of the sulphimide which is identical to the product obtained according to (a) and (b) are then obtained (yield 65% of the theoretical).

The following comparative tests were carried out:

(a) 101 parts by weight (0.5 mol) of 3-nitro-benzenesulfonic acid amide are dissolved or suspended in a solution of 20 parts by weight of sodium hydroxide in 105 parts by volume of water. There were then added simultaneously and dropwise at 20 to 30° C. with vigorous stirring the following solutions:

(1) A solution of 20 parts by weight of sodium hydroxide in 30 parts by volume of water and
(2) 71.5 parts by weight of N,N-dimethylsulfamic acid chloride. The reaction mixture is stirred for a further hour at about 50° C. and another hour at 195° C. The solution is strongly acid in reaction. The precipitate is separated by suction filtration, and concentrated hydrochloric acid is added to the filtrate, when a small further quantity of precipitate is formed. The precipitates are added together and extracted with aqueous sodium carbonate solution. Only a very small quantity of it goes into solution; the residue (95 parts by weight) consists of 3-nitrobenzene sulfonamide.

(b) 101 parts by weight (0.5 mol) of 3-nitrobenzenesulfonamide are dissolved or suspended in a solution of 20 parts by weight of sodium hydroxide in 100 parts by volume of water. The solution is covered with a layer of 200 parts by volume of toluene. 71.5 parts by weight of N,N-dimethylsulfamic acid chloride and 0.5 mol of a 40% sodium hydroxide solution are then added dropwise both at the same time at 25 to 30° C. with vigorous stirring, care being taken to ensure that the temperature does not rise above 40° C. When the heat of reaction has died down, heating is continued for one hour at 85° C. On working up of the reaction mixture, the 3-nitro-benzenesulfonamide using as starting material is recovered practically quantitatively.

EXAMPLE 2

N-(piperidylsulfonyl)-3-nitrobenzene sulfonamide 112 parts by weight (0.5 mol) sodium 3-nitrobenzene sulfonamide and 55 parts by weight of sodium carbonate are thoroughly mixed in a trituration crucible and the mixture is suspended in 300 parts by volume of acetonitrile. 92 parts by weight of N-chlorosulfonylpiperidine are added at 80° C. with thorough stirring. After 8 hours' boiling under reflux, the acetonitrile is distilled off by introduction of steam. The reaction mixture is diluted with water to a total of 700 parts by weight, heated to 60° C. and filtered. The residue is again extracted with 500 parts by volume of water at 60° C. The combined filtrates are acidified to pH 4–5 with 20% hydrochloric acid. After the reaction mixture has been left to stand overnight at room temperature, it is heated to 60° C. and the precipitate, which consists mainly of 3-nitrobenzenesulfonamide, is separated by suction filtration and the filtrate is acidified with 75 parts by volume of concentrated hydrochloric acid.

The precipitate is dissolved in a solution of 30 parts by weight of sodium bicarbonate in 550 parts by volume of water at 50° C., a small quantity of 3-nitrobenzenesulfonamide remaining behind, and the solution is decolourised with active charcoal, and 100 parts by volume of concentrated hydrochloric acid are added, which precipitates the disulfimide in almost pure form. The yield is 69 parts by volume of a product of equivalent weight 353 (calculated 347).

A sample recrystallised from slightly acidified water melts at 125° C.

$C_{11}H_{15}N_3O_6S_2$.—Calcd.: C, 37.81%, H, 4.33%; N, 12.03%; S, 18.35%. Found: C, 37.69%; H, 4.62%; N, 11.96%; S, 18.60%.

EXAMPLE 3

N-(diethylamidosulfonyl)-4-nitrobenzenesulfonic acid amide 112 parts by weight (0.5 mol) sodium 4-nitrobenzene sulfonic acid amide and 55 parts by weight of sodium carbonate are suspended in 300 parts by volume of acetonitrile. 86 parts by weight of N,N-diethylsulfamic acid chloride are added dropwise at 80° C. and the reaction mixture heated for 8 hours under reflux. The acetonitrile is distilled off by blowing in steam, the residue is made up to 1,200 parts by weight with water and separated at 50° C. from a small quantity of an oily impurity, and the solution is heated to 90° C. with active charcoal. After filtration, the product is left to cool to 50° C., acidified to pH 4 with hydrochloric acid and separated from the precipitated 4-nitrobenzene sulfonic acid amide by suction filtration. 60 parts by volume of concentrated hydrochoric acid is added to the filtrate, which results in the precipitation of 62 parts by weight of the disulfimide. To purify the product, it is taken up in 19 parts by weight of sodium bicarbonate in 250 parts by volume of water at 50° C., separated by suction from a small undissolved residue and reprecipitated with concentrated hydrochloric acid. Yield 46 parts by weight of melting point 87–90° C., equivalent weight 340 (calculated 337).

$C_{10}H_{15}N_3O_6S_2$.—Calcd.: C, 35.60%; H, 4.48%; N, 12.46%; S, 19.01%. Found: C, 35.93%; H, 4.80%; N, 12.46%; S, 19.09%.

EXAMPLE 4

N-(piperidyl-sulfonyl)-4-nitrobenzenesulfonic acid amide 112 parts by weight (0.5 mol) of sodium 4-nitrobenzene sulfonic acid amide, 55 parts by weight of sodium carbonate and 92 parts by weight (0.5 mol) of N-chlorosulfonyl-piperidine are reacted together in a manner analogous to Example 3. The acetonitrile is distilled off with steam, the residue is diluted with water to 1,100 parts by weight and heated to 90° C. and the solution is separated from an oily impurity and adjusted to pH 4–5 with 70 parts by volume of 20% hydrochloric acid, separated from the precipitate by suction at 80° C., decolourised with active charcoal and treated with 75 parts by volume of concentrated hydrochloric acid at 90° C. The precipitated disulfimide (108 parts by weight) is taken up in a solution of 27 parts by weight of sodium bicarbonate in 500 parts by volume of water at 65° C., separated from undissolved residue by suction and again precipitated with 50 parts by volume of concentrated hydrochloric acid. The yield is 78 parts by weight of melting point 161 to 163° C.; equivalent weight 360 (calculated 349).

$C_{11}H_{15}N_3O_6S_2$.—Calcd.: C, 37.81%; H, 4.33%; N, 12.03%; (349.37). Found: C, 38.13%; H, 4.45%; N, 12.49%.

EXAMPLE 5

N-(dimethylamidosulfonyl)-4-nitrobenzenesulfonic acid amide 112 parts by weight (0.5 mol) of sodium 4-nitrobenzene sulfonamide, 55 parts by weight of sodium carbonate and 72 parts by weight (0.5 mol) of N,N-dimethylsulfamic acid chloride are reacted together in a manner analogous to Example 3.

Acetonitrile is distilled off by blowing steam into the reaction mixture, and the mixture is diluted with water to 800 parts by weight, acidified to pH 4–5 with concentrated hydrochloric acid and separated hot from precipitated 4-nitrobenzenesulfonamide (15 parts by weight) by suction, and 85 parts by volume of concentrated hydrochloric acid are added to the filtrate. The precipitated disulfimide (107 parts by weight) is taken up in 500 parts by volume of water and 30 parts by weight of sodium bicarbonate at 60° C. and separated by suction from undissolved residue and the filtrate is decolourised with active charcoal and reprecipitated with 85 parts by volume of concentrated hydrochloric acid. The yield is 73.5 parts by weight; melting point 132° C.; equivalent weight 319 (calculated 309).

$C_8H_{11}N_3O_6S_2$.—Calcd.: C, 31.06%; H, 3.58%; N, 13.59%; S, 20.73%. Found: C, 31.07%; H, 3.66%; N, 15.47%; S, 20.95%.

EXAMPLE 6

N-(dimethyl-amidosulfonyl)-p-toluenesulfonic acid amide 96.5 parts by weight of sodium p-toluenesulfonamide, 55 parts by weight of sodium carbonate and 72 parts by weight of N,N-dimethyl-sulfamic acid chloride are reacted together in 300 parts by volume of acetonitrile in a manner analogous to Example 3. The solvent is removed by steam distillation, the residue is diluted to 700 parts by weight with water, acidified to pH 4 with concentrated hydrochloric acid and separated after some time from precipitated toluene sulfonamide by suction. The filtrate is boiled with active charcoal, and 70 parts by volume of concentrated hydrochloric acid are added at 50° C. The precipitated disulfimide is taken up in the equivalent quantity of aqueous sodium bicarbonate solution, separated by suction filtration from undissolved residue and reprecipitated by the addition of hydrochloric acid. Yield 45 parts by weight. The product may be purified further by recrystallisation from twice its quantity of toluene. M.P. 100–104° C., equivalent weight 278 (calculated 278).

$C_9H_{14}N_2O_4S_2$.—Calcd.: C, 38.83%; H, 5.07%; N, 10.07%; S, 23.04%; (278.34). Found: C, 38.85%; H, 5.26%; N, 10.21%; S, 22.93%.

The following compounds can be prepared in analogous manner:

N-(diethylamidosulfonyl)-6-toluenesulfonic acid amide of M.P. 133–135° C., equivalent weight 309 (calculated 306.4).

$C_{11}H_{18}N_2O_4S_2$.—Calcd.: C, 43.12%; H, 5.92%; N, 9.14%; S, 20.93%; (306.39). Found: C, 43.06%; H, 5.98%; N, 9.18%; S, 21.11%.

N-(piperidylsulfonyl)-6-toluenesulfonic acid amide of melting point 135–138° C., equivalent weight 322 (calcd. 318.4).

$C_{12}H_{18}N_2O_4S_2$.—Calcd.: C, 45.25%; H, 5.70%; N, 8.80%; S, 20.14%; (318.41). Found: C, 45.42%; H, 5.81%; N, 8.96%; S, 19.63%.

EXAMPLE 7

31 parts by weight (0.25 mol) of N,N-dimethyl-sulfuryldiamide are dissolved in the equivalent quantity of 10% sodium hydroxide solution, and the solution is concentrated by evaporation in vacuo. The residue is dried by azeotropic distillation with benzene, and together with 26 parts by weight (0.25 mol) of sodium carbonate it is suspended in 100 parts by volume of acetonitrile. A solution of 55.5 parts by weight (0.25 mol) of 3-nitrobenzenesulfochloride in a small quantity of acetonitrile is added dropwise at 50° C. with vigorous stirring. The reaction mixture is refluxed for 7 hours. The filtrate is removed hot from the precipitated sodium chloride by suction, and the precipitate is then washed with a small quantity of hot acetonitrile. The filtrate is concentrated by evaporation in vacuo and the residue is taken up in water and the pH of the solution adjusted to 5 to 6, the solution filtered and then strongly acidified. The oil which separates crystallises when triturated. The disulfimide obtained in 50% yield is found to have the following values on analysis:

$C_8H_{11}N_3O_6S_2$.—Calcd.: C, 31.06%; H, 3.58%; N, 13.59%; S, 20.73%. Found: C, 31.35%; H, 3.59%; N, 13.46%; S, 21.96%.

EXAMPLE 8

N-(dimethylamidosulfonyl)-p-toluenesulfonic acid amide 68 parts by weight of sodium N,N-dimethyl-sulfuryldiamide and 51 parts by weight of sodium carbonate are thoroughly mixed together and suspended in 250 parts by volume of dry toluene. A solution of 88.5 parts by weight of p-toluenesulfonic acid chloride in a small quantity of toluene is added dropwise with vigorous stirring at 80° C., and the reaction mixture is then boiled under reflux for 20 hours. It is then left to cool and filtered with suction. The residue freed from toluene is stirred together with 500 parts by volume of water, and the pH of the solution is adjusted to 6 with concentrated hydrochloric acid and the solution filtered. 100 parts by volume of concentrated hydrochloric acid are added to the filtrate, when 80 parts by weight of still impure N-(dimethylamidosulfonyl)-p-toluenesulfonic acid amide precipitate. This is purified by taking it up in aqueous sodium bicarbonate solution and reprecipitating it with concentrated hydrochloric acid and recrystallising it from the double quantity of toluene.

EXAMPLE 9

N-(piperidylsulfonyl)-p-toluenesulfonic acid amide 31 parts by weight of sodium N-(amidosulfonyl)-piperidine and 22 parts by weight of sodium carbonate are suspended in 100 parts by volume of acetonitrile. A solution of 33 parts by weight of p-toluenesulfonic acid chloride in 50 parts by volume of acetonitrile are added dropwise at 80° C., with stirring. The reaction mixture is then boiled under reflux for 8 hours. The acetronitrile is swept out with steam and the residue is made up to 650 parts by weight with water, adjusted to pH 6 with 20% hydrochloric acid and separated from the small quantity of residue by suction filtration. 50 parts by volume of concentrated hydrochloric acid are added to the filtrate. The precipitated N-(piperidylsulfonyl)-p-toluenesulfonic acid amide (28 parts by weight) is purified by recrystallisation from three times the quantity of toluene. Melting point 140 to 142° C., equivalent weight 322 (calculated 318).

EXAMPLE 10

N-(piperidylsulfonyl)-3-nitrobenzenesulfonic acid amide 31 parts by weight of sodium N-(amidosulfonyl)-piperidine, 22 parts by weight of sodium carbonate and 38.5 parts by weight of 3-nitrobenzenesulfonic acid chloride are reacted together as specified in Example 3. Working up is also carried out according to Example 3. 38 parts by weight of N-(piperidylsulfonyl)-3-nitrobenzene sulfonic acid amide are obtained, which are purified by being taken up in aqueous sodium bicarbonate solution and reprecipitated from concentrated hydrochloric acid.

What we claim is:

1. A compound of the formula $$R-SO_2-NH-SO_2-N\begin{matrix}R_1\\R_2\end{matrix}$$

wherein R is methyl, phenyl, or phenyl substituted by nitro or methyl, and $R_1$ and $R_2$ each represent a lower alkyl radical or together represent an alkylene radical having 4–6 carbon atoms and forming together with the nitrogen atom a heterocyclic ring.

2. The compound of the formula $$O_2N-C_6H_4-SO_2-NH-SO_2-N(CH_3)_2$$

3. The compound of the formula $$CH_3-C_6H_4-SO_2-NH-SO_2-N(CH_2CH_2)_2CH_2$$

References Cited

UNITED STATES PATENTS 3,336,382    8/1967    Pearson et al.

FOREIGN PATENTS 125,390    6/1900    Germany.

OTHER REFERENCES

Chem. Abstracts, vol. 63, 6906 a, Leuchenko, et al., September 1965.

HENRY R. JILES, Primary Examiner

S. D. WINTERS, Assistant Examiner

U.S. Cl. X.R.

260—085.5, 239, 239.8, 326.82, 397.7, 543, 556